Jan. 11, 1938. T. R. WALTON 2,105,021
WINDSHIELD WIPER BLADE
Filed June 22, 1935
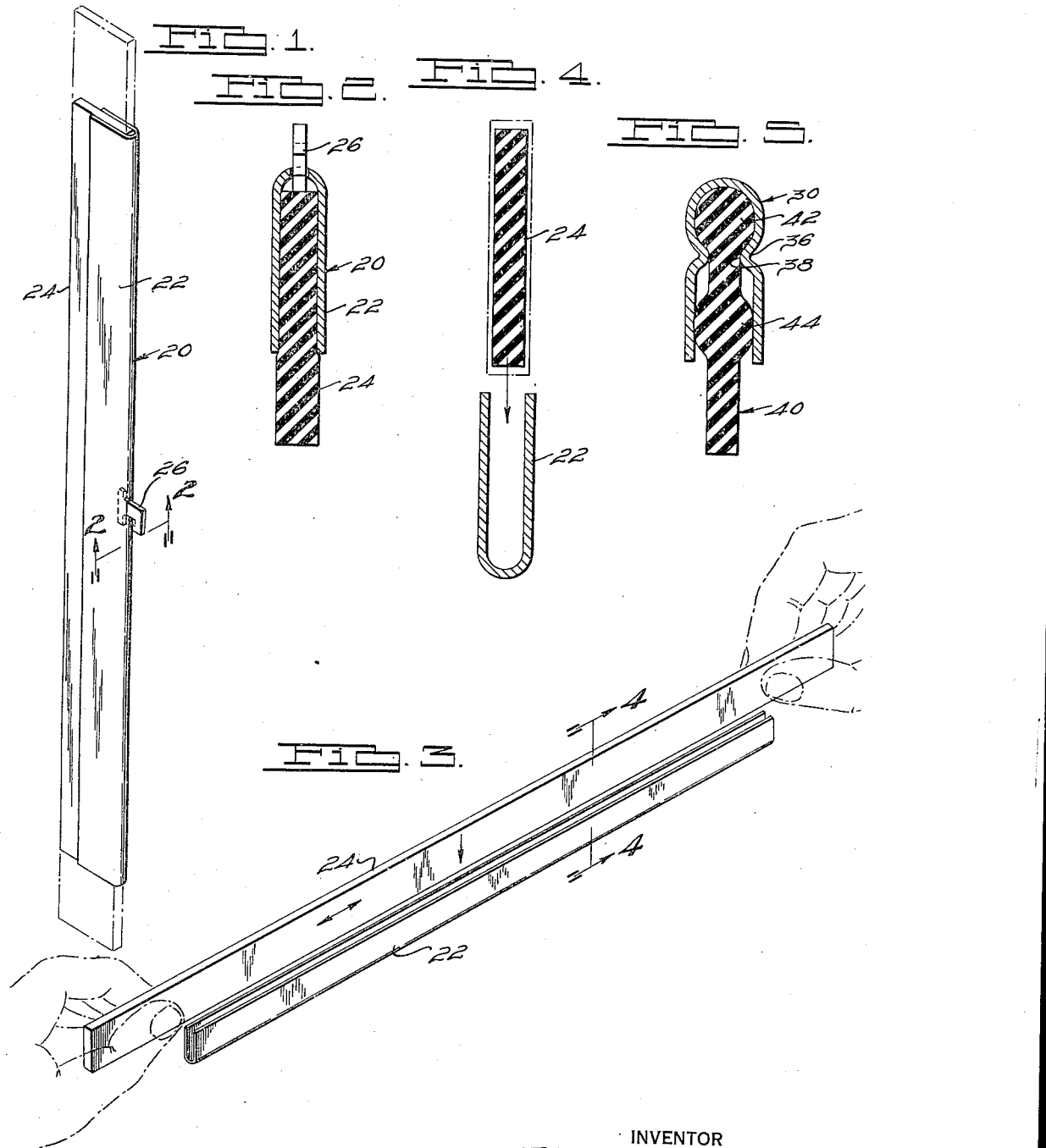
INVENTOR
Thomas R. Walton.
BY
Harness, Dickey, Pierce & Hann.
ATTORNEYS.

Patented Jan. 11, 1938

2,105,021

UNITED STATES PATENT OFFICE 2,105,021

WINDSHIELD WIPER BLADE

Thomas R. Walton, Birmingham, Mich.

Application June 22, 1935, Serial No. 27,936

5 Claims. (Cl. 15—245)

This invention relates to windshield wiper blades, and while the construction herein shown and described is fully applicable to complete original assemblies for production purposes, it is also designed to permit the flexible wiping element of a windshield wiper blade of conventional construction to be replaced without requiring the replacement of the backing member thereof.

Objects of the invention include the provision of a windshield wiper blade of new and novel construction; the provision of a windshield wiper blade including a rigid backing member and a flexible wiping element maintained therein under a longitudinal tension and lateral compression; the provision of a windshield wiper blade in which the wiping element is maintained in the backing member by friction set up between them due to a constant tendency of the wiping element to increase in thickness; and the provision of a windshield wiper blade in which the wiping element is under a constant tension tending to contract it longitudinally within its backing member.

Other objects of the invention include the provision of a method of making a windshield wiper blade including the provision of a generally channel sectioned shape-maintaining backing member, providing a resilient wiping element of a normal section greater than the interior dimension of the backing member, longitudinally stretching the wiping element to reduce its lateral dimensions sufficiently to permit its insertion into the backing member, inserting the stretched wiping element into the backing member, and relieving the stretching force thereon whereby to permit the wiping element to expand and to frictionally secure itself to the interior walls of the backing member.

Other objects of the invention include the method of repairing a conventional form of windshield wiper blade including a channel sectioned backing member and a flexible wiping element clamped therein, comprising removing the flexible wiping element from the backing member, stretching a new resilient wiping element until its thickness is less than the interior width of the backing member, inserting the stretched new wiping element into the backing member and relieving the stretching force thereon, whereby to permit it to longitudinally contract and laterally expand to fill the interior of the backing member and frictionally lock it thereto.

The above being among the objects of the present invention, the same consists in certain novel features of construction, combinations of parts, and step or steps of operation to be hereinafter described with reference to the accompanying drawing, and then claimed, having the above and other objects in view.

In the accompanying drawing which illustrates suitable embodiments of the present invention and in which like numerals refer to like parts throughout the several views, Fig. 1 is a perspective view of my improved windshield wiper blade;

Fig. 2 is an enlarged transverse sectional view taken on the line 2—2 of Fig. 1;

Fig. 3 is a perspective view illustrating the method of inserting the flexible wiping element into the backing member of the construction shown in the previous view;

Fig. 4 is an enlarged transverse sectional view taken on the line 4—4 of Fig. 3; and, Fig. 5 is a view similar to Fig. 2 but illustrating a modified form of construction.

Referring to Figs. 1 and 2, a windshield wiper blade is indicated generally at 20 as comprising a backing member 22 and cooperating flexible wiping element 24. The backing element 22 is formed from sheet metal into a channel or U-shaped section as indicated and the flexible wiping element 24, formed from rubber or other suitable flexible material, is received therein and one edge thereof projects outwardly from the open edge of the channel for contact with the surface of the windshield to be cleaned. As will be noted from an inspection of Fig. 2, that portion of the wiping element 24 which projects outwardly beyond the open edge of the channel of the backing member 22 is of slightly greater thickness than that portion thereof received within the backing member, and as will hereinafter be more fully explained, this is for the reason that that portion of the wiping element received in the backing member is maintained under lateral compression. The blade 20 is also shown as being provided with a conventional form of arm connection member 26 although, as far as the present invention is concerned, it makes no difference what form of connection is employed between the windshield wiper arm (not shown) and the blade.

In constructing a windshield wiper blade of the character illustrated in Figs. 1 and 2 in original production, the backing member 22 is formed to the desired size, shape and contour, and a wiping element, preferably of strip formation and of any desired cross sectional configuration but having a normal maximum thickness slightly greater than the interior width of the channel of the backing member 22, is provided. The simplest cross sectional configuration of such a wiping element is rectangular as illustrated and where the back member 22 is of the proportions indicated in Figs. 3 and 4, the wiping element 22 will be of proportionately greater thickness than the interior width of the channel of the backing member 22 such as indicated in Fig. 4. In such case, the wiping element 24 is made of slightly greater length than the backing element 22 and the extremities of the wiping element 24 are grasped by the hands of the operator or by some other suitable instrumentality and the wiping element 24 is stretched longitudinally thereof a sufficient amount to reduce the normal thickness thereof to less than the interior width of the channel of the backing member, as for instance, to the extent indicated in full lines in Fig. 4, whereupon the wiping element 24 is inserted within the channel of the backing member 22 and the stretching force applied thereto is then relieved. When the stretching force of the wiping element 24 is thus relieved, the wiping element immediately tends to contract to normal condition, and in contracting its thickness increases until it completely fills the width of the channel in the backing member 22 before it has completely returned to normal thickness and in attempting to still further contract, it is placed under lateral compression and at the same time, under longitudinal tension. This action of attempting to contract longitudinally and to swell laterally causes the wiping element 24 to be firmly frictionally engaged between the opposite side walls of the channel in the backing member and to lock it in place with ample security for its intended purpose. The ends of the wiping element which are thus left projecting beyond the ends of the backing member 22, as illustrated in dotted lines in Fig. 1, are then cut off and the wiper blade is ready for use. It will be understood, of course, that where a connecting member of the character illustrated at 26 is employed in the wiper blade structure, such connecting member will be inserted in place with respect to the backing member before the wiping element 24 is positioned in finally assembled relation with respect to the backing member. Other types of connecting members may be applied before or after assembly of the backing member and the wiping element, depending upon the particular type thereof.

When the flexible wiping element of a windshield wiper blade becomes stiff, acquires a permanent set, becomes torn or otherwise unfitted for satisfactory wiping operation and it becomes necessary or desirable to remedy such defects in it, it has been necessary heretofore to throw away the entire wiper blade and to replace it with a new one including both the wiping element and the backing member. It is one feature of the present invention to provide a means or method whereby when the flexible wiping element of a windshield wiper blade becomes unfit for further service, it may be removed from the backing member and replaced by a new wiping element without necessity of destroying the old backing member, and this in a manner which is relatively simple and easy of accomplishment. In this manner it is possible to renew the flexible wiping element of a windshield wiper blade at a minimum cost and in such a manner that the resulting structure will be as efficient as an entirely new blade assembly.

Should the wiping element 24 become unfit for its intended purpose, whether from becoming hardened through age, becoming permanently set, becoming torn, or for any other reason, it will be apparent that it may be stripped from the backing member 22 and a new wiping element 24 inserted in its place in the same manner as above described.

It will also be understood that there are windshield wiper blades now on the market of the same general appearance as illustrated in Figs. 1 and 2, except that in such case the backing member is initially formed flat and is bent about one edge of the wiping element and the opposite sides of the backing element are squeezed together so as to clamp it to the wiping element. In such case the surface portions of the wiping element, which engage the holder sides, will be placed under both lateral and longitudinal compression and not under longitudinal tension as in the case above described. In such a conventional type of windshield wiper blade, should the wiping element become unsatisfactory for further use for any of the reasons above described, it may be stripped from the backing member in the same manner as above described and a new wiping element such as 24 inserted into the backing member in its place in the same manner as described in connection with the construction shown in Figs. 1 and 2.

The embodiments of Fig. 5 illustrates the adaptation of the invention to backing members of the channel type, in which the single or multiply rubber strips are held within the channel by forming grooves which extend throughout the length thereof. Such backing member is designated at 30 and it will be appreciated that the grooves 36 extend substantially throughout the length thereof and so form inwardly extending ribs which act to grip the original strip or strips and hold it or them within the channel. The grooves 36, conventionally, are formed in the backing member 30 after insertion of the wiper element or elements.

Heretofore, when the usefulness of such a windshield wiper blade has become impaired for any of the reasons above described, or for any other reason, it has been necessary to throw away the entire wiper blade and replace it with an entirely new one including both back member and wiping element. This is for the reason that it is practically impossible for the ordinary user, without special tools, to remove the old wiping element and replace it by a similar new one. The present invention provides a method whereby when such a wiping element, or any other equivalent wiping element of conventional construction, has its usefulness impaired to such an extent as to require replacement, the old wiping element may be removed from the backing member and replaced by a new wiping element that to all intents and purposes will return the windshield wiper blade to its originally intended effective condition.

Where it is desired to replace the original wiping element associated with a backing member of the form shown in Fig. 5, without the necessity of obtaining an entire new wiper blade, the wiping element may be stripped from the backing member 30 in any suitable manner and a new wiping element re-inserted into the backing member 30 in accordance with the method described in connection with Figs. 3 and 4. However, if a wiping element of rectangular section, such as the wiping element 24, is employed in such case, its normal thickness will necessarily have to be greater than the distance between the projections 38 in the channel of the backing member 30, and in stretching it to reduce its thickness to permit it to be inserted between the projections 38, it will, in most cases, upon release of the stretching force, be gripped in the backing member between the projections 38 only. This may leave such a width of wiping element unsupported by the backing member as to render it too flexible for satisfactory use, and in such case a wiping element 40, of the cross sectional configuration illustrated in Fig. 5, may be resorted to.

The wiping element indicated generally at 40 in Fig. 5 is provided with a more or less bulbous edged portion 42 adapted to be received in the backing member 30 between the projections 38 thereof and the bottom of the channel therein, and a second portion 44 adapted to be received within the channel of the backing member 30 adjacent the open edge thereof. In such a case, the portion connecting the two thickened portions 42 and 44 may or may not be of sufficient thickness when allowed to expand within the backing member to contact both projections 38, but this is more or less immaterial if either the portions 42 or 44, or both, expand upon the contraction of the wiping element 40 into engagement with the sides of the channel of the backing member. However, in cases where the thickened portion 42 is adapted to expand laterally in the contact with the side walls of the channel in the backing member 30, it may be necessary in assembling the wiping element 40 to the backing member 30 to stretch the wiping element 40 and then introduce it endwise into the backing member 30. It will thus be apparent that the particular direction of movement of the wiping element with respect to the backing member during assembly is more or less unimportant, as long as the thickness of any portion of the wiping element is normally greater than the corresponding width of the channel in the backing member in which it is to be received, and the wiping element is placed under tension in the direction of its length while it is being inserted into place in the backing member and is then allowed to contract towards its normal condition, so as to enable it to expand and secure itself into the backing member.

Although only two specific embodiments of the present invention have been shown and described, various modifications and changes will be apparent to those skilled in the art once the present teachings have been made known to them and, accordingly, it will be understood that formal changes may be made in the specific embodiments of the invention described without departing from the spirit or substance of the broad invention, the scope of which is commensurate with the appended claims.

What I claim is:

1. A windshield wiper blade comprising, in combination, a backing member and a flexible wiping member secured therein with surface portions of said wiping member engaged by said backing member and held thereby under lateral compression and longitudinal tension.

2. A windshield wiper blade including a self-sustaining backing member of channel-like formation and a flexible wiping element received therein with surface portions of said element engaged by said member and held thereby under lateral compression and longitudinal tension and with one edge of said element projecting outwardly from said member.

3. A windshield wiper blade including, in combination, a backing member of channel-like section having a restriction in the interior width thereof intermediate the bottom of the channel and the open edge thereof, and a flexible wiping element having a thickened edge portion received in said backing member between said restriction and the bottom of the channel thereof, surface portions of said element being engaged by said member and held thereby under lateral compression and longitudinal tension.

4. A windshield wiper blade comprising, in combination, a sheet metal backing member of channel-like formation, and a rubber wiping element having one edge thereof secured in said channel with surface portions thereof engaged by said member and held thereby under lateral compression and longitudinal tension.

5. A windshield wiper blade construction comprising, in combination, a sheet metal backing member of generally channel shaped section having a restriction in its interior width intermediate the bottom of the channel and the open side thereof, and a flexible wiping element having a thickened side edge portion and a portion intermediate opposite side edges thereof also thickened, said thickened edge portion being received in the channel of said backing mmber between said restriction and the bottom of said channel, and the second mentioned thickened portion being received in said channel adjacent the open edge thereof, surface portions of said element being engaged by said member and held thereby under lateral compression and longitudinal tension.

THOMAS R. WALTON.